(12) United States Patent
Hayaishi

(10) Patent No.: US 10,166,454 B2
(45) Date of Patent: Jan. 1, 2019

(54) SWING ANALYSIS DEVICE, SWING ANALYSIS SYSTEM, SWING ANALYSIS METHOD, AND STORAGE MEDIUM

(71) Applicant: SEIKO EPSON CORPORATION, Tokyo (JP)

(72) Inventor: Ikuo Hayaishi, Asahi-mura (JP)

(73) Assignee: SEIKO EPSON CORPORATION, Tokyo (JP)

( * ) Notice: Subject to any disclaimer, the term of this patent is extended or adjusted under 35 U.S.C. 154(b) by 282 days.

(21) Appl. No.: 15/202,062

(22) Filed: Jul. 5, 2016

(65) Prior Publication Data

US 2017/0021227 A1    Jan. 26, 2017

(30) Foreign Application Priority Data

Jul. 24, 2015  (JP) .................... 2015-146409

(51) Int. Cl.
A63F 9/24 (2006.01)
A63B 69/36 (2006.01)
G06K 9/00 (2006.01)

(52) U.S. Cl.
CPC ...... *A63B 69/3608* (2013.01); *G06K 9/00342* (2013.01)

(58) Field of Classification Search
None
See application file for complete search history.

(56) References Cited

U.S. PATENT DOCUMENTS

| 8,690,698 B2 | 4/2014 | Saito et al. |
| 2013/0274027 A1 | 10/2013 | Saito et al. |
| 2014/0379293 A1 | 12/2014 | Sato |
| 2015/0119158 A1 | 4/2015 | Sato |

FOREIGN PATENT DOCUMENTS

| JP | 2005-110850 A | 4/2005 |
| JP | 2008-073210 A | 4/2008 |
| JP | 2012-110594 A | 6/2012 |
| JP | 2013-220209 A | 10/2013 |
| JP | 2015-002910 A | 1/2015 |
| JP | 2015-084954 A | 5/2015 |

*Primary Examiner* — Paul A D'Agostino
(74) *Attorney, Agent, or Firm* — Oliff PLC

(57) ABSTRACT

A swing analysis device includes an angle calculator that calculates an upper limit angle and a lower limit angle during a predetermined period of swing of a sporting apparatus based on a plurality of angles of the sporting apparatus for predetermined planes; and an index setting unit that sets an upper limit plane based on the upper limit angle and a stroke direction, and sets a lower limit plane based on the lower limit angle and the stroke direction.

23 Claims, 7 Drawing Sheets

SWING ANALYSIS SYSTEM

SWING INFORMATION

SWING ANALYSIS DEVICE, SWING ANALYSIS SYSTEM, SWING ANALYSIS METHOD, AND STORAGE MEDIUM

BACKGROUND

1. Technical Field

The present invention relates to a swing analysis device, a swing analysis system, a swing analysis method, and a storage medium.

2. Related Art

JP-A-2015-84954 discloses a device that generates an image of a V zone including a shaft plane and the Hogan plane and an image of the movement locus of a golf club using the output of inertial sensors which are mounted on the golf club and a user, and displays the images on a display unit.

The shaft plane is a plane which is formed by a longitudinal axial direction of the shaft of the golf club and a target line (stroke direction) at address (stop state) in golf. The Hogan plane is a plane which is formed by a virtual line, which connects from the bottom of the neck (the base of the neck) of a golfer to a ball, and a target line at address in golf. An area which is interposed between the shaft plane and the Hogan plane is referred to as the V zone. The V zone is determined at the golfer's address, and the good or bad stroke is evaluated based on whether or not the golf club is included in the V zone in a case of down swing or impact.

The V zone has been known as one of the indexes which are used to evaluate the golf swing. The V zone is an area which is interposed between the shaft plane and the Hogan plane. For example, it is possible to evaluate a shot, in which a down swing locus is included in the V zone, as a nice shot.

However, although the V zone is determined by the postures of the golf club and the golfer, there is a case in which the V zone is not appropriate for the golfer. For example, a low skilled golfer is likely to lose motivation for continuing practice because there is a low possibility that the swing is included in the V zone. In contrast, for example, a high skilled golfer wants to review the good or bad swing even in a case in which the swing is included in the V zone of the golfer. As described above, the V zone may be not appropriate for the golfer according to the skill or the object of the practice.

SUMMARY

An advantage of some aspects of the invention is to set a more appropriate evaluation index for each user.

An aspect of the invention is directed to a swing analysis device including: an angle calculator that calculates an upper limit angle and a lower limit angle during a predetermined period of swing of a sporting apparatus based on a plurality of angles of the sporting apparatus for predetermined planes; and an index setting unit that sets an upper limit plane based on the upper limit angle and a stroke direction, and sets a lower limit plane based on the lower limit angle and the stroke direction. According to this configuration, an evaluation index is set which is more appropriate than an evaluation index (for example, the V zone) based on data at a specific point of time.

In the swing analysis device according to the aspect of the invention, the angle calculator may calculate a degree of variation in the respective angles of the sporting apparatus for the respective predetermined planes in the plurality of locations which are included in a locus during the predetermined period based on the locus of the sporting apparatus, and may calculate the upper limit angle and the lower limit angle based on the degree of variation. According to this configuration, it is possible to set the upper limit plane and the lower limit plane in which the swing locus is more easily included, and thus it is possible to improve, for example, the motivation of a low-skilled user for practicing. In addition, the angle of the upper limit plane and the lower limit plane easily varies according to the tendency of the swing, thereby being useful, for example, for a high-skilled user to review the swing in more detail.

In the swing analysis device according to the aspect of the invention, the predetermined plane may be a horizontal plane which includes the stroke direction, and the angle calculator may calculate the angle formed by a line, which connects the location and an axis corresponding to the stroke direction and which crosses the axis by a predetermined angle, and the predetermined planes. According to this configuration, it is possible to calculate angles of the sporting apparatus for the predetermined planes from the locus of the sporting apparatus.

The swing analysis device according to the aspect of the invention may further include an evaluation unit that compares a location of the locus of the sporting apparatus during the predetermined period with a location of at least one of the upper limit plane and the lower limit plane. According to this configuration, it is possible to acquire the result of comparison of the swing locus and the evaluation index.

The swing analysis device according to the aspect of the invention may further include an evaluation unit that compares an upper limit angle of a first swing with an upper limit angle of a second swing, or compares a lower limit angle of the first swing with a lower limit angle of the second swing. According to this configuration, it is possible to acquire the result of comparison of the evaluation indexes of two different swings.

The swing analysis device according to the aspect of the invention may further include an output unit that outputs an image which expresses at least one of the upper limit plane and the lower limit plane. According to this configuration, it is possible for the user to objectively recognize a swing evaluation index.

In the swing analysis device according to the aspect of the invention, the angle calculator may calculate an upper limit angle and a lower limit angle of reference swing, which is reference, based on the upper limit angle and the lower limit angle of each of a plurality of swings, and the index setting unit may set an upper limit plane and a lower limit plane of the reference swing based on the upper limit angle and the lower limit angle of the reference swing. According to this configuration, it is possible to acquire an average swing evaluation index of a plurality of swings.

The swing analysis device according to the aspect of the invention may further include an evaluation unit that compares a location of a locus of the sporting apparatus during the predetermined period of a first swing with a location of at least one of the upper limit plane and the lower limit plane of the reference swing. According to this configuration, it is possible to acquire the result of comparison of a specific swing locus and the average swing evaluation index.

The swing analysis device according to the aspect of the invention may further include the evaluation unit that compares an upper limit angle of a first swing with the upper limit angle of the reference swing or compares a lower limit angle of the first swing with the lower limit angle of the reference swing. According to this configuration, it is possible to acquire the result of comparison of a specific swing evaluation index and the average swing evaluation index.

The swing analysis device according to the aspect of the invention may further include an output unit that outputs an image which expresses at least one of the upper limit plane and the lower limit plane of the reference swing. According to this configuration, it is possible for the user to objectively recognize the average swing evaluation index.

The swing analysis device according to the aspect of the invention may further include an output unit that outputs an image or sound which expresses a result of comparison performed by the evaluation unit. According to this configuration, it is possible for the user to objectively recognize the result of comparison which indicates the evaluation of the swing.

Another aspect of the invention is directed to a swing analysis method including: calculating an upper limit angle and a lower limit angle during a predetermined period of swing of a sporting apparatus based on a plurality of angles of the sporting apparatus for predetermined planes; setting an upper limit plane based on the upper limit angle and a stroke direction; and setting a lower limit plane based on the lower limit angle and the stroke direction. According to this configuration, an evaluation index is set which is more appropriate than an evaluation index (for example, the V zone) based on data at a specific point of time.

Still another aspect of the invention is directed to a program which causes a computer to calculate an upper limit angle and a lower limit angle during a predetermined period of swing of a sporting apparatus based on a plurality of angles of the sporting apparatus for predetermined planes; to set an upper limit plane based on the upper limit angle and a stroke direction; and to set a lower limit plane based on the lower limit angle and the stroke direction. Therefore, an evaluation index is set which is more appropriate than an evaluation index (for example, the V zone) based on data at a specific point of time.

Yet another aspect of the invention is directed to a swing analysis system including a sensor unit that is mounted on a sporting apparatus; and a swing analysis device that communicates with the sensor unit, and the swing analysis device includes a data acquisition unit that acquires measurement data from the sensor unit; a position calculator that calculates a locus of swing of the sporting apparatus during a predetermined period based on the measurement data; an angle calculator that calculates an upper limit angle and a lower limit angle for predetermined planes of the sporting apparatus based on the locus; and an index setting unit that sets an upper limit plane based on the upper limit angle and a stroke direction and sets a lower limit plane based on the lower limit angle and the stroke direction. Therefore, with a simple system configuration which includes the sensor unit and the swing analysis device, an evaluation index is set which is more appropriate than an evaluation index (for example, the V zone) based on data at a specific point of time.

Still yet another aspect of the invention is directed to a swing analysis method including: acquiring measurement data from a sensor unit which is mounted on a sporting apparatus; calculating a locus of swing of the sporting apparatus during a predetermined period based on the measurement data; calculating an upper limit angle and a lower limit angle for predetermined planes of the sporting apparatus based on the locus; setting an upper limit plane based on the upper limit angle and a stroke direction; and setting a lower limit plane based on the lower limit angle and the stroke direction. Therefore, with a simple system configuration which includes the sensor unit and the swing analysis device, an evaluation index is set which is more appropriate than an evaluation index (for example, the V zone) based on data at a specific point of time.

The above-described object, configurations, and advantages will be clear by the description of an embodiment below.

BRIEF DESCRIPTION OF THE DRAWINGS

The invention will be described with reference to the accompanying drawings, wherein like numbers reference like elements.

DESCRIPTION OF EXEMPLARY EMBODIMENT

Hereinafter, an embodiment of the invention will be described with reference to the accompanying drawings.

Figure 1:
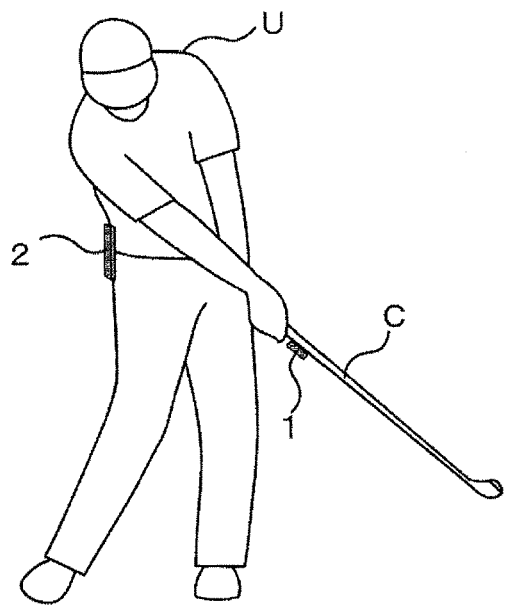
FIG. 1 is a diagram illustrating an example of the configuration of a swing analysis system according to an embodiment of the invention.

FIG. 1 is a diagram illustrating an example of the configuration of a swing analysis system according to an embodiment of the invention.

The swing analysis system includes a sensor unit 1 and a swing analysis device 2. The sensor unit 1 and the swing analysis device 2 can communicate with each other through wireless communication or wired communication. In addition, FIG. 1 illustrates a golf club C (corresponding to a sporting apparatus according to the invention) and a user U who swings the golf club C.

The sensor unit 1 includes an inertial sensor, and measures accelerations of axial directions of three respective axes, which respectively have orthogonal relationship, and angular speeds which are generated around the three respective axes using the inertial sensor. The sensor unit 1 includes, for example, three detection axes having an x axis, a y axis, and a z axis. The sensor unit 1 is attached to a part of the shaft of the golf club C by, for example, assembling the y axis with the longitudinal axial direction of the shaft of the golf club C. The sensor unit 1 measures, for example, accelerations of three axial directions of the golf club C, which are generated by the swing of the user U and angular speeds around the three respective axes. The sensor unit 1 transmits, for example, the measured accelerations and the angular speeds (hereinafter, referred to as measurement data) to the swing analysis device 2.

The swing analysis device 2 is, for example, a terminal device such as a smart phone, a tablet computer, or a personal computer. In FIG. 1, the swing analysis device 2 is a smart phone and is mounted on the waist of the user U.

The swing analysis device 2 receives the measurement data from the sensor unit 1, and analyzes swing motion of the golf club C based on the received measurement data. The swing analysis device 2 calculates, for example, a swing locus. The swing locus is, for example, time-series data of a location and posture of a predetermined part, such as the head of the golf club C during a swing period.

The swing analysis device 2 acquires a plurality of angles of the golf club C for predetermined planes during the swing period, and sets a goal referred to as a swing zone based on the angles. In addition, the swing analysis device 2 displays, for example, the swing zone, the swing zone and the swing locus, results of comparison of the swing zone and the swing locus, or the like on a display. A process relevant to the swing zone will be described later.

Meanwhile, the sensor unit 1 may be mounted on a part of the body of the user U. For example, the sensor unit 1 may be mounted on the arm of the user U, and may measure accelerations and angular speeds which are generated by the motion of the arm. The swing analysis device 2 may be installed in a place other than the user U.

Figure 2:
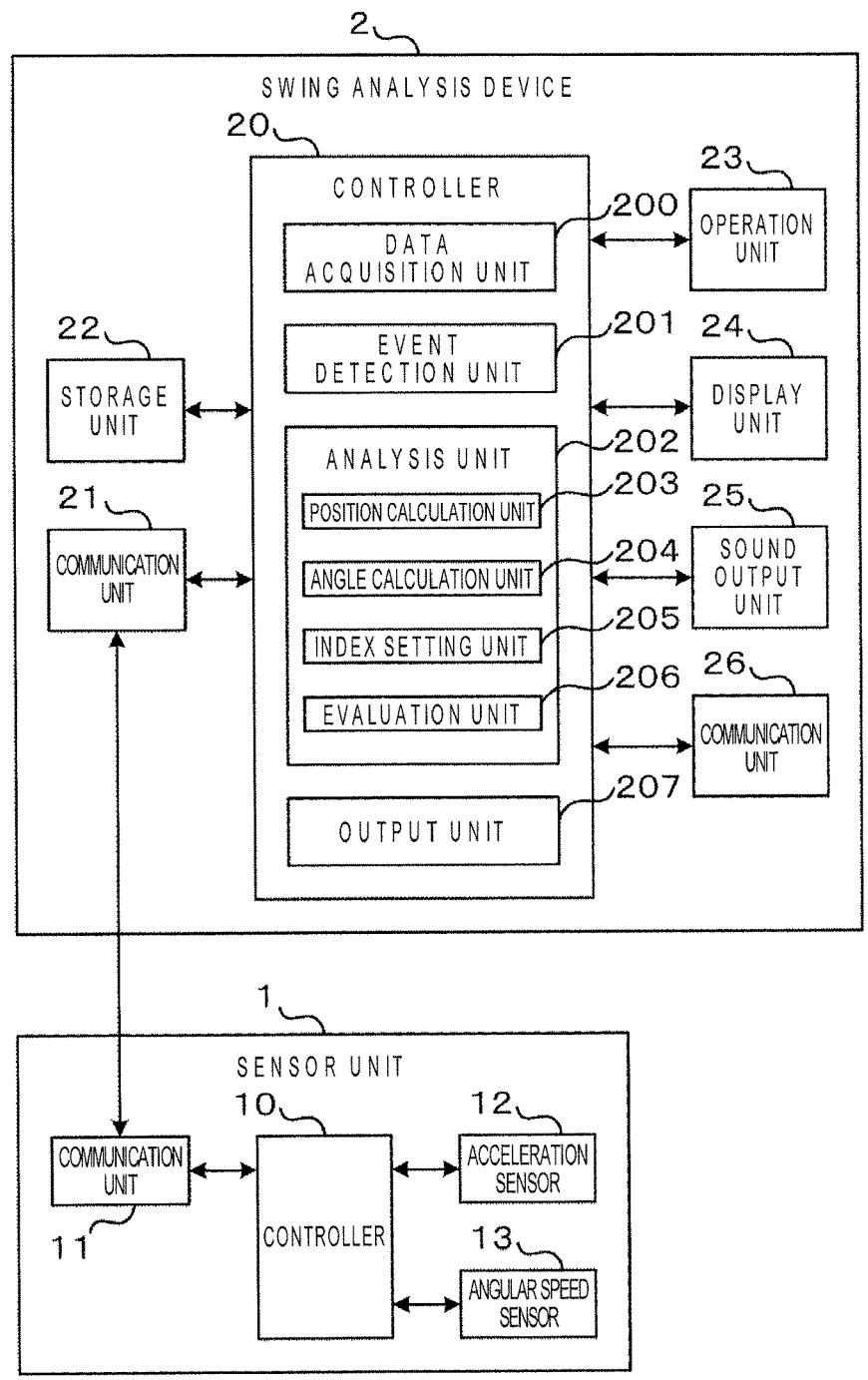
FIG. 2 is a block diagram illustrating an example of the functional configuration of the swing analysis system.

FIG. 2 is a block diagram illustrating an example of the functional configuration of the swing analysis system.

The sensor unit 1 includes a controller 10, a communication unit 11, an acceleration sensor 12, and an angular speed sensor 13.

The controller 10 comprehensively controls the sensor unit 1. The controller 10 receives measurement data (acceleration data and angular speed data) from each of the acceleration sensor 12 and the angular speed sensor 13, and adds measurement time to the received measurement data, and outputs resulting data to the communication unit 11.

The communication unit 11 transmits the measurement data (including the measurement time), which is output from the controller 10, to the swing analysis device 2. In addition, the communication unit 11 receives a control command from the swing analysis device 2 and outputs the received control command to the controller 10. The controller 10 performs various processes according to the control command.

The acceleration sensor 12 measures accelerations which are respectively generated in three axial directions which have approximately orthogonal relationship. The acceleration sensor 12 outputs the measured accelerations to the controller 10 using, for example, digital signals.

The angular speed sensor 13 measures angular speeds generated around the three respective axes which are in approximately orthogonal relationship. The angular speed sensor 13 outputs the measured angular speeds to the controller 10 using, for example, digital signals.

The swing analysis device 2 includes a controller 20, a communication unit 21, a storage unit 22, an operation unit 23, a display unit 24, a sound output unit 25, and a communication unit 26.

The communication unit 21 receives the measurement data from the sensor unit 1. In addition, the communication unit 21 outputs the received measurement data to the controller 20. In addition, the communication unit 21 receives the control command which is output from the controller 20. In addition, the communication unit 21 transmits the received control command to the sensor unit 1.

The storage unit 22 stores data or the like which is used for a process by the controller 10. It is possible to realize the storage unit 22 using, for example, a non-volatile storage device such as a Hard Disk Drive (HDD) or a flash Read Only Memory (ROM).

Figure 3:
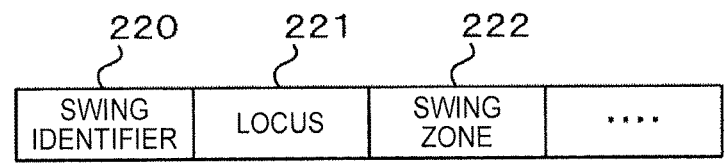
FIG. 3 is a diagram illustrating an example of data configuration of swing information.

The storage unit 22 stores swing information as illustrated in, for example, FIG. 3 (diagram illustrating an example of the data configuration of the swing information). The swing information can include each record of swing. Each record includes items such as a swing identifier 220, a locus 221, and a swing zone 222. The swing identifier 220 is, for example, data, such as date and time, which identifies swing. The locus 221 is, for example, data which indicates a locus such as the coordinates of a location of a predetermined part of the golf club C during the swing period. Although the swing zone 222 will be described later, the swing zone 222 is, for example, data which indicates the range of variation in relative angles for each of the predetermined planes in a location included in the locus. Each of the records is generated, for example, in a case in which swing is analyzed, and is stored in the storage unit 22.

The operation unit 23 receives an operation input of the user, and outputs an operation signal according to the operation to the controller 20. It is possible to realize the operation unit 23 using, for example, an input device such as a key, a touch sensor, or a touch panel.

The display unit 24 displays the results of processes performed by the controller 20 as letters, figures, graphs, tables, animations, and the other images. It is possible to realize the display unit 24 by, for example, a display device such as a Liquid Crystal Display (LCD), an Organic Electro-Luminescence Display (OLED), or an Electrophoretic Display (EPD).

The sound output unit 25 outputs the results of processes performed by the controller 20 as sounds. It is possible to realize the sound output unit 25 by, for example, a sound output device such as a speaker or a buzzer.

The communication unit 26 communicates with a computer, such as a server, through a network. It is possible to realize the communication unit 26 by, for example, a communication device such as a network or an interface device.

The controller 20 comprehensively controls the swing analysis device 2. The controller 20 includes a data acquisition unit 200, an event detection unit 201, an analysis unit 202, and an output unit 207.

It is possible to realize the controller 20 by, for example, a computer which includes an arithmetic operation device such as a Central Processing Unit (CPU), a volatile storage device such as a Random Access Memory (RAM), a non-volatile storage device such as a ROM, an interface (I/F) circuit which connects the controller 20 to other units, and a bus which connects the devices to each other. The computer may include a processing circuit which performs various processes such as an image process. In addition, the controller 20 may be realized by a circuit such as an Application Specific Integrated Circuit (ASIC).

It is possible to realize at least a part of the functions (the data acquisition unit 200, the event detection unit 201, the analysis unit 202, and the output unit 207) of the controller 20 in such a way that, for example, the CPU causes the RAM to read and execute a predetermined program which is stored in the ROM. The predetermined program is, for example, an application program which operates on an Operating System (OS), and it is possible to read the predetermined program from a portable storage medium and to install the predetermined program in the swing analysis device 2, and it is possible to download the predetermined program from the server on the network and to install the predetermined program in the swing analysis device 2. It is apparent that at least a part of the functions of the controller 20 may be realized by, for example, the processing circuit. In addition, at least a part of the functions of the controller 20 may be realized by, for example, both the CPU and the processing circuit.

The data acquisition unit 200 acquires measurement data from the sensor unit 1 through the communication unit 21. The data acquisition unit 200 acquires the measurement data, for example, on a predetermined sampling cycle, and stores the measurement data, for example, in a storage device such as the RAM or the storage unit 22.

The event detection unit 201 detects a series of events (referred to as "rhythm") from the beginning to the end of the swing operation based on the measurement data. The events include, for example, from the beginning to the end of the swing, sequentially, back swing, top, down swing, impact, and follow through. In addition, the event detection unit 201 specifies each of the periods (for example, a back swing period from the beginning of the swing to the top, a down swing period from the top to the impact, and a follow through period from the impact to the end of the swing) during the swing. Since a technology disclosed in, for example, JP-A-2012-254205 may be used for the detection of the events and the specification of each of the periods during the swing, the detailed description thereof will not be repeated.

The analysis unit 202 analyzes swing motion based on the measurement data. The analysis unit 202 includes a position calculator 203, an angle calculator 204, an index setting unit 205, and an evaluation unit 206.

The position calculator 203 calculates a swing locus based on the measurement data. The swing locus is shown in, for example, spatial coordinates (3 dimensional coordinates) in which the location (location in a case in which the swing begins) at a time of the address of the head of the golf club C is set to an original point.

Figure 4:
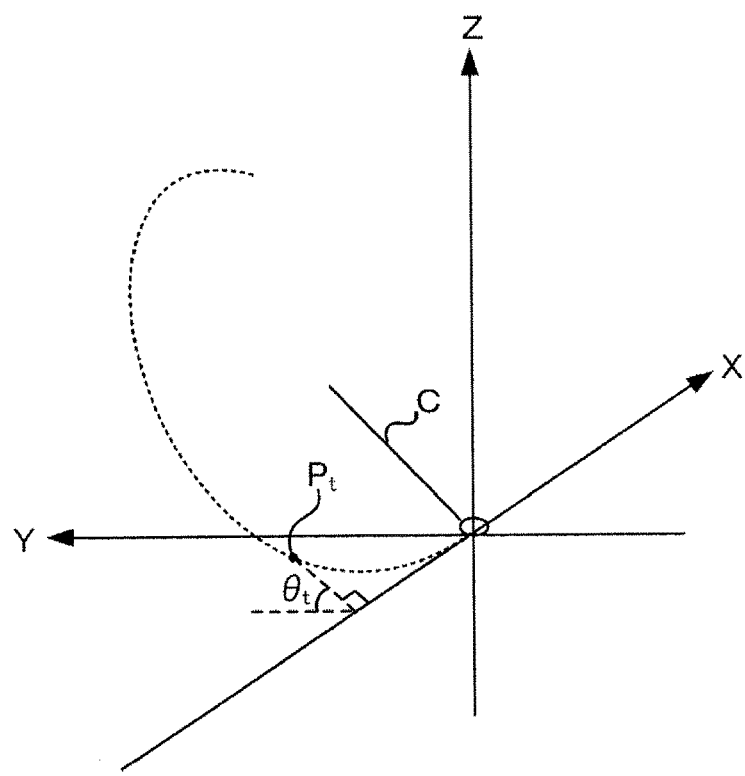
FIG. 4 is a diagram illustrating a relative angle for an XY plane of a location which is included in a swing path.

The spatial coordinates are defined by a coordinate system such as illustrated in, for example, FIG. 4 (diagram illustrating a relative angle for an XY plane of a location which is included in a swing path). An X axis is an axis corresponding to a target line which indicates a goal direction (stroke direction) of a stroke (not shown in the drawing). A Y axis is an axis in a horizontal direction which is perpendicular to the X axis. A Z axis is an axis corresponding to vertical direction (gravity direction).

In FIG. 4, the swing locus is a time-series set of a location $P_t$ (location P in time t) of the head of the golf club C during the swing period. FIG. 4 illustrates a locus of the period from the top to the impact during the swing (a broken line in the drawing).

Meanwhile, since the position calculator 203 can calculate the swing locus based on the measurement data using a known technology, the detailed description thereof will not be repeated.

The angle calculator 204 calculates relative angles for predetermined planes with regard to a plurality of respective locations included in the swing locus. The predetermined plane is, for example, a horizontal plane and corresponds to an XY plane in FIG. 4. The angle calculator 204 lowers, for example, a perpendicular line for the X axis from the location $P_t$, and acquires an angle $\theta_t$ (an angle $\theta$ in time t), which is formed by the perpendicular line and the XY plane, as the relative angle. In this manner, the angle calculator 204 can acquire the relative angles $\theta_t$ for the plurality of respective locations $P_t$ on the swing locus. It is apparent that a line, which crosses the X axis from the location $P_t$ at a predetermined angle other than a perpendicular angle, may be lowered instead of lowering the perpendicular line for the X axis from the location $P_t$. The angle calculator 204 may receive the setting of the predetermined angle from the user through, for example, the operation unit 23 or the communication unit 26.

In addition, the angle calculator 204 calculates the degree of variation in the relative angles for the respective predetermined planes of the plurality of locations. The angle calculator 204 calculates an average $\theta_a$ of the relative angles $\theta_t$ in the plurality of 1 to n locations $P_t$ using, for example, the following Equation (1).

$$\theta_a = \frac{1}{n} \sum_{t=0}^{n} \theta_t \tag{1}$$

In addition, the angle calculator 204 calculates the standard deviation S of the plurality of 1 to n relative angles $\theta_t$ based on the calculated average $\theta_a$ using, for example, the following Equation (2). The standard deviation S corresponds to the degree of variation.

$$S = \sqrt{\frac{1}{n} \sum_{t=0}^{n} (\theta_a - \theta_t)^2} \tag{2}$$

In addition, the angle calculator 204 calculates an upper limit angle and a lower limit angle which define a range of variation in the relative angles $\theta_t$ based on the calculated standard deviation S as expressed in, for example, the following Equation (3). The swing zone corresponds to the range of variation. Here, a is a coefficient which is used to determine the lower limit angle of the swing zone and is, for example, "2". b is a coefficient which is used to determine the upper limit angle of the swing zone and is, for example, "2". It is apparent that different values may be set to a and b. The angle calculator 204 may receive the setting of the coefficient a and the coefficient b from the user through, for example, the operation unit 23 or the communication unit 26.

$$\theta_a - aS < \text{SwingZone} < \theta_a + bS \tag{3}$$

Figure 5:
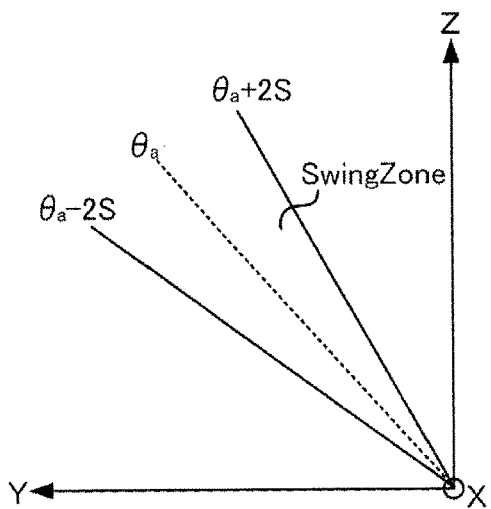
FIG. 5 is a graph illustrating a swing zone.

As described above, the angle calculator 204 calculates the upper limit angle and the lower limit angle of the swing zone. FIG. 5 is a graph illustrating a swing zone. FIG. 5 is a graph in which a YZ plane is viewed from the negative direction to the positive direction of the X axis. In addition, FIG. 5 illustrates respective $\theta_a - aS$, $\theta_a$, and $\theta_a + bS$ by angles in which an X axis is used as a rotational axis. As described above, it is possible to graphically express the swing zone as an area which has a fixed size.

The angle calculator 204 may calculate the swing zone of reference swing (hereinafter, referred to as a "reference swing zone") by synthesizing swing zones of a plurality of swings. It is possible to use the reference swing zone to be compared with an individual swing zone or an individual swing locus. The angle calculator 204 acquires an average $\theta_{aa}$ of the respective averages $\theta_a$ of the swings with reference to, for example, the swing information which is stored in the storage unit 22. In addition, the angle calculator 204 acquires, for example, the average $S_a$ of the respective standard deviations S of the swings. The angle calculator 204 calculates the upper limit angle and the lower limit angle of the reference swing zone using the same equation as, for example, Equation (3) based on the average $\theta_{aa}$ and the standard deviation $S_a$ which are acquired as described above.

Meanwhile, the sequence of the calculation of the reference swing zone is not limited to the above sequence. The angle calculator 204 may acquire the average of the averages $\theta_a$ of the relative angles of a previously acquired reference swing and the average $\theta_a'$ of the relative angles of a currently analyzed swing as the average $\theta_a$ of the current reference swing using, for example, the following Equation (4). $\alpha$ is a weight coefficient of the average $\theta_a'$. The angle calculator 204 may receive the setting of the weight coefficient $\alpha$ from the user through, for example, the operation unit 23 or the communication unit 26.

$$\theta_a = \frac{\theta_a + \alpha \theta_a'}{2} \quad (4)$$

In addition, the angle calculator 204 may acquire the square root of an average of a dispersion $S^2$ of the standard deviation S of the previously acquired reference swing and the square of the difference between an average $\theta_a'$ of the relative angles of the currently analyzed swing and an average $\theta_a$ of the relative angles of the previously acquired reference swing as the standard deviation S of the current reference swing using, for example, the following Equation (5). $\beta$ is a weight coefficient of the square root of the difference between the average $\theta_a'$ and the average $\theta_a$. The angle calculator 204 may receive a set of the weight coefficients $\beta$ from the user through, for example, the operation unit 23 or the communication unit 26.

$$S = \sqrt{\frac{S^2 + \beta(\theta_a' - \theta_a)^2}{2}} \quad (5)$$

In this manner, it is not necessary to calculate the average of the swing zones of a plurality of past swings, and thus it is possible to reduce the load of the arithmetic operation. In addition, it is possible to adjust a degree of influence of a current swing zone for the reference swing zone according to the set of the weight coefficient $\alpha$ and the weight coefficient $\beta$.

The index setting unit 205 sets an upper limit plane and a lower limit plane of the swing zone based on the upper limit angle and the lower limit angle of the swing zone which is calculated by the angle calculator 204. The index setting unit 205 specifies a plane (lower limit plane) which has a predetermined width and is acquired by rotating the X axis by an angle $\theta_a$–aS for the XY plane as a rotating shaft in, for example, an XYZ coordinate system. In addition, the analysis unit 202 specifies a plane (upper limit plane) which is acquired by rotating the X axis as the rotating shaft by an angle $\theta_a$+bS for the XY plane. The index setting unit 205 sets the data which specifies the upper limit plane and the lower limit plane as the swing zone. The index setting unit 205 sets the upper limit plane and the lower limit plane for the reference swing in the same manner.

The index setting unit 205 may set a swing identifier to the swing which is analyzed as described above, and may store the record which includes the swing identifier in the swing information of the storage unit 22. The index setting unit 205 may set data relevant to the locus which is calculated by the position calculator 203 to the record (locus 221). The index setting unit 205 may set the data relevant to the average of the relative angles which are calculated by the angle calculator 204, data relevant to the upper limit angle and the lower limit angle, data which specifies the upper limit plane and the lower limit plane, and the like to the record (swing zone 222). The index setting unit 205 may set the information relevant to the event which is detected by the event detection unit 201 to the record. The index setting unit 205 may store the record in the swing information for the reference swing in the same manner.

The evaluation unit 206 evaluates the swing by comparing the swing zone which is set as described above with other data. The evaluation unit 206 receives designation of the evaluation target swing from the swing information from the user through, for example, the operation unit 23 or the communication unit 26. The evaluation unit 206 specifies the lower limit plane and the upper limit plane of the swing zone based on the record of the designated swing. Thereafter, the evaluation unit 206 determines whether each of the locations which are included in the designated swing locus is included in, for example, an inner side area which is formed by an upper side plane and a lower side plane, included in an outside area from the upper side plane, or included in a space which is outside rather than the lower side plane. In this manner, the evaluation unit 206 can cause the results of the comparison of the swing locus and the swing zone to be included in the results of analysis.

The evaluation unit 206 may compare different swing data. The evaluation unit 206 compares, for example, the swing locus of a designated first swing and the swing zone of a designated second swing. The second swing may be the reference swing.

The evaluation unit 206 may compare the swing zones of different swings. The evaluation unit 206 compares, for example, the upper limit angle (or the lower limit angle) of the swing zone of a designated first swing with the upper limit angle (or the lower limit angle) of the swing zone of the designated second swing. Thereafter, the evaluation unit 206 determines which one of the upper limit angles (or the lower limit angles) of the two swing zones is larger. The first or the second swing may be the reference swing.

The evaluation unit 206 may evaluate the width of the swing zone. The evaluation unit 206 calculates, for example, the difference in the upper limit angles and the lower limit angles of the designated swing zone. Thereafter, the evaluation unit 206 determines whether or not the calculated difference is greater than a predetermined value.

Meanwhile, the analysis unit 202 may acquire the V zone of the swing. The V zone is, for example, an area which is interposed between a shaft plane and a Hogan plane. The shaft plane is, for example, a plane which is formed by a longitudinal axial direction of the shaft of the golf club and the target line at address in golf. The Hogan plane is, for example, a plane which is formed by a virtual line connecting from the bottom of the neck of the golfer to the ball and the target line at address in golf. Since a known technology may be used as a V zone calculation method, the detailed description thereof will not be performed.

The output unit 207 generates the image data, which indicates the results of analysis of the swing motion that is analyzed by the analysis unit 202, and outputs the image data. The image data includes, for example, the swing locus of the golf club C, the swing zone, and the like. The output unit 207 receives the designation of the output target swing from the swing information from the user through, for example, operation unit 23 or the communication unit 26. In addition, the output unit 207 generates the image data based on the designated swing record.

The output unit 207 outputs, for example, the generated image data to the display unit 24 to display the generated image data. The output unit 207 may output, for example, the generated image data to an external device, such as a Personal Computer (PC), a tablet PC, a smart phone, or a Head Mount Display (HMD), through the communication unit 26, and display the image data.

Figure 6:
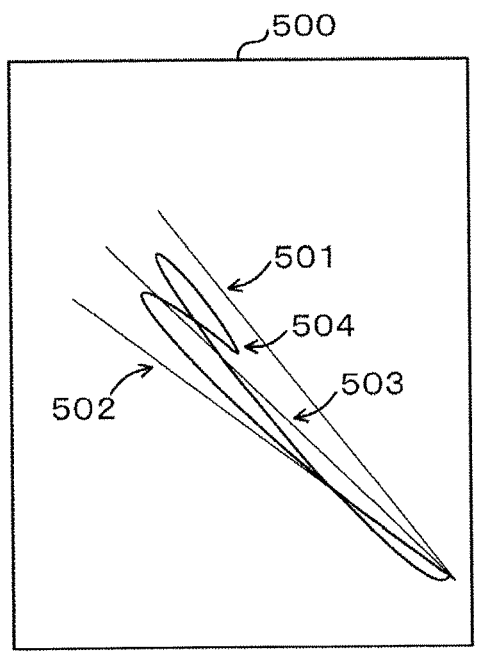
FIG. 6 is a diagram illustrating an example of a configuration of a screen which expresses the swing zone.

FIG. 6 is a diagram illustrating an example of a configuration of a screen which expresses the swing zone. A screen 500 indicates a case in which the YZ plane is viewed from the negative direction to the positive direction of the X axis. The screen 500 includes an image 501 which indicates the upper limit plane of the swing zone, an image 502 which indicates the lower limit plane of the swing zone, an image 503 which indicates the average of the relative angles, and an image 504 which indicates the swing locus. The swing zone may be the reference swing or the designated swing. In addition, the swing zone and the swing locus may be different swings. Meanwhile, the output unit 207 may not display the image 504. The output unit 207 may display one or two of the images 501 to 503.

The user can grasp, for example, the locational relationship or the like between the swing zone and the swing locus from the screen 500 of FIG. 6. Therefore, the user can simply and objectively determine the good or bad condition of the swing.

Figure 7:
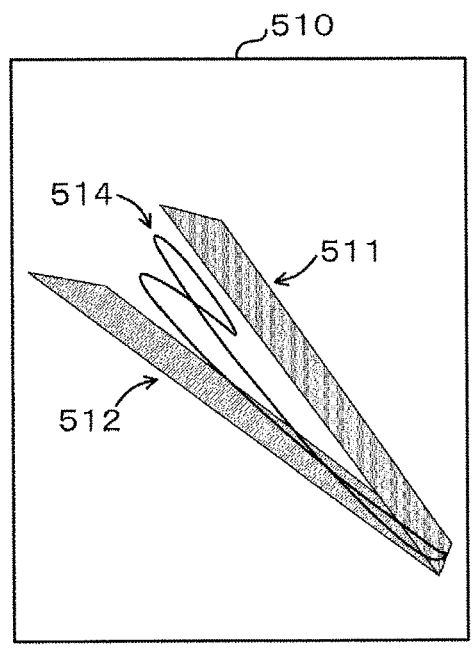
FIG. 7 is a diagram illustrating another example of a configuration of a screen which expresses the swing zone.

FIG. 7 is a diagram illustrating another example of the configuration of the screen which expresses the swing zone. A screen 510 indicates a case in which the swing zone is viewed from a viewpoint in which setting is performed in the XYZ coordinate system. The screen 510 includes an image 511 which indicates the upper limit plane of the swing zone, an image 512 which indicates the lower limit plane of the swing zone, and an image 514 which indicates the swing locus. The output unit 207 may generate, for example, two-dimensional image data in which the upper limit plane and the lower limit plane are viewed from the set viewpoint. The swing zone may be the reference swing or the designated swing. In addition, the swing zone and the swing locus may be different swings. Meanwhile, the output unit 207 may not display the image 514. The output unit 207 may display one of the images 511 and 512. The output unit 207 may specify and display a plane (average plane) which is acquired by rotating the X axis as the rotating shaft by the angle $\theta_a$ for the XY plane.

The user can stereoscopically grasp, for example, the locational relationship or the like between the swing zone and the swing locus from the screen 510 of FIG. 7. Therefore, the user can simply and objectively determine the good or bad condition of the swing.

Figure 8:
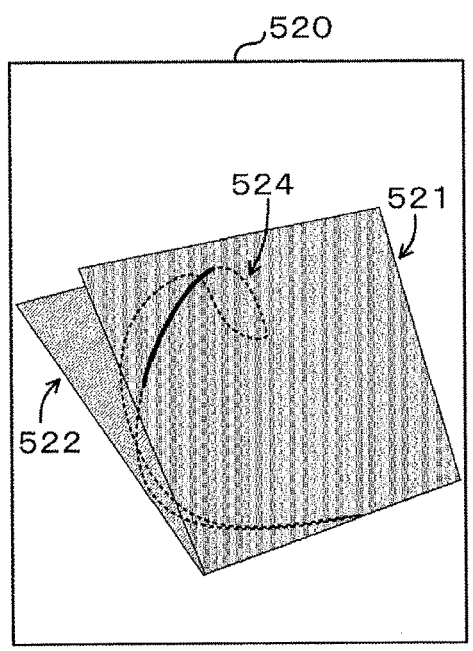
FIG. 8 is a diagram illustrating a still another example of a configuration of a screen which expresses the swing zone.

FIG. 8 is a diagram illustrating a still another example of the configuration of the screen which expresses the swing zone. A screen 520 indicates a case in which the swing zone is viewed from a viewpoint in which setting is performed in the XYZ coordinate system. The screen 520 includes an image 521 which indicates the upper limit plane of the swing zone, an image 522 which indicates the lower limit plane of the swing zone, and an image 524 which indicates the swing locus. The output unit 207 may generate, for example, two-dimensional image data in which the upper limit plane and the lower limit plane are viewed from the set viewpoint. The output unit 207 displays the image 524 in different display states on the inside and the outside of the swing zone (an area which is interposed between the image 521 and the image 522) based on the results of comparison with the locus and the swing zone which are compared by the evaluation unit 206. In the example of FIG. 8, the image 524 is expressed by a broken line on the inside of the swing zone, and is expressed by a solid line on the outside of the swing zone. The swing zone may be the reference swing or may be the designated swing. In addition, the swing zone and the swing locus may be different swings. Meanwhile, the output unit 207 may display one of the images 521 and 522. The output unit 207 may specify and display a plane (average plane) which is acquired by rotating the X axis as the rotating shaft by the angle $\theta_a$ for the XY plane.

The user can grasp, for example, the locational relationship or the like between the swing zone and the swing locus from the screen 520 of FIG. 8. In addition, the user can distinguish and grasp, for example, the loci of the inside and the outside of the swing zone. Therefore, the user can simply and objectively determine the good or bad condition of the swing.

Figure 9:
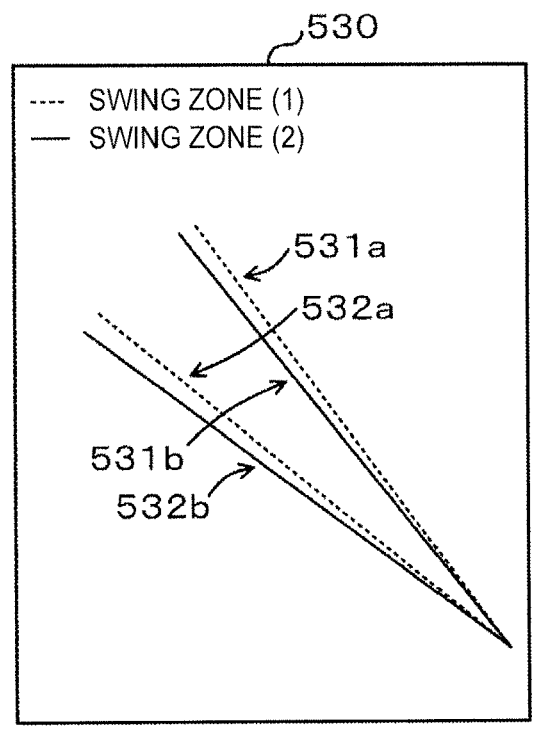
FIG. 9 is a diagram illustrating a still another example of a configuration of a screen which expresses the swing zone.

FIG. 9 is a diagram illustrating a still another example of the configuration of the screen which expresses the swing zone. A screen 530 indicates a case in which the YZ plane is viewed from the negative direction to the positive direction of the X axis. The screen 530 includes an image (an image 531a which indicates the upper limit plane and an image 532a which indicates the lower limit plane) which indicates the swing zone of the first swing, and an image (an image 531b which indicates the upper limit plane and an image 532b which indicates the lower limit plane) which indicates the swing zone of the second swing. The first swing is, for example, the reference swing or the designated swing. The second swing is, for example, the designated swing. Meanwhile, the output unit 207 may display an image which indicates the designated swing locus. The output unit 207 may display any of a combination of the image 531a and the image 531b and a combination of the image 532a and the image 532b. The output unit 207 may display an image which indicates the average $\theta_a$ of each of the first swing and the second swing. In addition, as illustrated in FIG. 7, each of the images may be three-dimensionally displayed.

The user can grasp, for example, the locational relationship or the like between two swing zones from the screen 530 of FIG. 9. For example, since the swing zone has a different angle according to the tendency of the swing (for example, straight, slice, hook, or the like), it is possible to relatively grasp the tendency of the swing by comparing two swing zones. In addition, it is possible to relatively grasp the state of the swing by, for example, comparing individual swings or comparing the individual swing with the reference swing. Therefore, the user can simply and objectively determine the good or bad condition of the swing.

It is apparent that the content of the display is not limited to the above-described examples. In addition, in a case in which at least a part of the swing locus is included in the outside of the swing zone (or the entire swing locus is included on the inside of the swing zone), the output unit 207 may display a message, which indicates the gist, based on, for example, the results of the comparison performed by the evaluation unit 206. In addition, in a case in which a part of the swing locus is included in the outside rather than the upper side plane (or a part of the swing locus is included on the outside rather than the lower side plane), the output unit 207 may display a message, which indicates the gist, based on, for example, the results of the comparison performed by the evaluation unit 206.

In addition, in a case in which the difference in the upper limit angles (or the lower limit angles) of two swing zones is greater than a predetermined threshold, the output unit 207 may display a message, which indicates the gist, based on, for example, the results of the comparison performed by the evaluation unit 206. In addition, in a case in which the width (difference between the upper limit angle and the lower limit angle) of the swing zone is greater or less than the predetermined value, the output unit 207 may display a message, which indicates the gist, based on, for example, the results of the comparison performed by the evaluation unit 206.

In addition, the output unit 207 may display, for example, an image (for example, an image which indicates the shaft plane and the Hogan plane) which indicates the V zone that is calculated by the analysis unit 202, together with the image which indicates the swing zone.

Description is returned to FIG. 2. The output unit 207 may generate and output sound data which indicates the results of analysis performed on the swing motion. The output unit 207 may generate, for example, a message as the sound data as described above, and may pronounce the message by outputting the message to the sound output unit 25. In addition, the output unit 207 may generate, for example, the message as the sound data, and may output the sound by outputting the message to the sound output unit which is provided in the sensor unit 1.

Meanwhile, the output unit 207 may output a signal according to the message as described above to, for example, a light emitting unit (for example, an LED or the like) which is provided in the swing analysis device 2 or the sensor unit 1, and may cause the light emitting unit to emit light using a predetermined light emitting color, a predetermined light emitting pattern, or the like.

Figure 10:
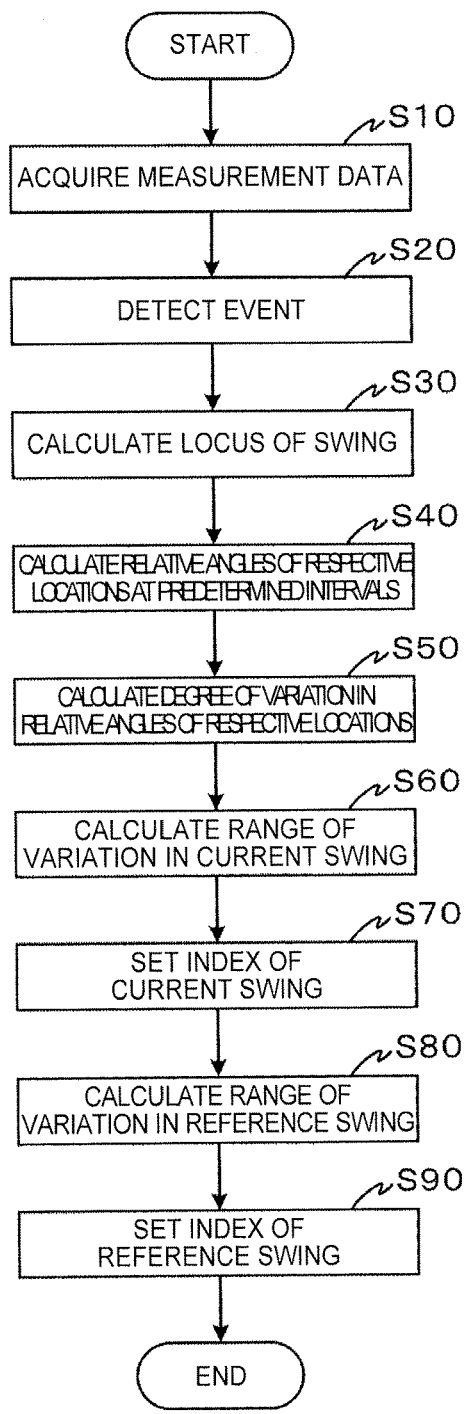
FIG. 10 is a flowchart illustrating an example of a swing analysis process.

FIG. 10 is a flowchart illustrating an example of a swing analysis process.

First, the data acquisition unit 200 acquires the measurement data from the sensor unit 1 (step S10).

Thereafter, the event detection unit 201 detects an event of the swing operation based on the measurement data acquired in step S10 (step S20).

Thereafter, the position calculator 203 calculates the swing locus based on the measurement data acquired in step S10 (step S30). The position calculator 203 may calculate the locus from the beginning to the end of the swing based on, for example, the event detected in step S20.

Thereafter, the angle calculator 204 calculates the relative angles for the predetermined planes with regard to the plurality of respective locations which are included in the swing locus based on the swing locus calculated in step S30 (step S40). The angle calculator 204 calculates the relative angles $\theta_t$ for, for example, the plurality of respective locations $P_t$ as described above.

Thereafter, the angle calculator 204 calculates the degree of variation in the relative angles based on the plurality of relative angles which are calculated in step S40 (step S50). The angle calculator 204 calculates, for example, the standard deviation S of the plurality of 1 to n relative angles $\theta_t$ as described above.

Thereafter, the angle calculator 204 calculates the range of variation in the swing detected in step S20 based on the degree of variation calculated in step S50 (step S60). The angle calculator 204 calculates, for example, the upper limit angle and the lower limit angle of the swing zone as described above.

Thereafter, the index setting unit 205 sets the index of the swing detected in step S20 based on the range of variation calculated in step S60 (step S70). The index setting unit 205 specifies, for example, the upper limit plane and the lower limit plane of the swing zone as described above. The index setting unit 205 generates the record of the swing which is analyzed as described above, and stores the record of the swing in the storage unit 22.

Thereafter, the angle calculator 204 calculates the range of variation in the reference swing by synthesizing the respective ranges of variation in the plurality of swings (step S80). The angle calculator 204 calculates the upper limit angle and the lower limit angle of the swing zone of the reference swing by acquiring the average of the respective standard deviations of the swings with reference to, for example, the swing information which is stored in the storage unit 22, as described above.

Thereafter, the index setting unit 205 sets the index of the reference swing based on the range of variation calculated in step S80 (step S90). The index setting unit 205 specifies, for example, the upper limit plane and the lower limit plane of the swing zone of the reference swing as described above. The index setting unit 205 generates the record of the reference swing which is analyzed as described above, and stores the record in the storage unit 22.

As described above, the swing analysis device 2 specifies the swing zone of the swing and the swing zone of the reference swing based on the acquired measurement data of the swing, and ends the process of the flowchart. The evaluation unit 206 may evaluate the swing as described above based on the generated swing information. The output unit 207 may output the image as described above based on the generated swing information.

Hereinabove, the embodiment of the invention has been described. According to the embodiment, it is possible to set a more appropriate evaluation index (swing zone) for the user. Since the swing zone is set based on the degree of variation in the angles (change in time-series angles) of a sporting apparatus during the swing, the swing locus may be included in the swing zone. Therefore, for example, it is possible to improve the motive of practice of a low-skilled user. In addition, the swing zone has a different angle according to the tendency of the swing (for example, straight, slice, hook, or the like). Therefore, for example, it is helpful for a high-skilled user to more specifically review the swing.

The invention is not limited to the above-described embodiment, and can be realized in various states in a scope without departing from the gist thereof. For example, in each embodiment, modifications as below may be added. In addition, two or more of the embodiment and each modified example may be appropriately combined.

The analysis unit 202 may calculate the swing locus for a designated period during, for example, a period from the beginning to the end of the swing. In addition, the analysis unit 202 may calculate the swing zone and the reference swing zone based on, for example, the swing locus of the designated period. Meanwhile, the analysis unit 202 may receive the designation of the period (for example, from the beginning to the impact of the swing) from the user through, for example, the operation unit 23 or the communication unit 26.

The output unit 207 may output, for example, an image which indicates the swing locus of the designated period. In addition, the output unit 207 may display, for example, the respective loci of the plurality of periods during the swing in different display states. For example, the output unit 207 displays the locus of the back swing period and the locus of the down swing period with different colors. Therefore, the user can simply grasp the locational relationship between the respective loci of the plurality of periods during the swing and the swing zones.

The output unit 207 may simultaneously display, for example, three or more swing zones. For example, the output unit 207 displays two swing zones, which are designated by the user, and the reference swing zone. Therefore, the user can grasp the change in conditions of the swing or the like.

In the embodiment, the event detection unit 201 determines an event based on the angular speed. However, the event may be detected, for example, based on, instead of the angular speed, acceleration or both the angular speed and the acceleration.

In the above-described embodiment, at least a part of the functions of the data acquisition unit 200, the event detection unit 201, the analysis unit 202 (the position calculator 203, the angle calculator 204, the index setting unit 205, and the evaluation unit 206), and the output unit 207 may be realized by the controller 10 of the sensor unit 1.

The configuration of the swing analysis system illustrated in FIG. 2 is classified according to main process content in order to easily understand the configuration of the swing analysis system. The invention is not limited according to a method of classifying the components or the names of the components. The configuration of the swing analysis system can be classified into a larger number of components according to the process content. In addition, it is possible to perform classification such that one component performs a larger number of processes. In addition, the process of each of the components may be performed by one piece of hardware or may be performed by a plurality of hardware. In addition, the division performed on the processes or functions of the respective components is not limited to the above if it is possible to achieve the object and advantages of the invention. For example, in the embodiment, the sensor unit 1 and the swing analysis device 2 are separately described. However, the function of the swing analysis device 2 may be mounted on the sensor unit 1 and vice versa.

The process units of the flowchart illustrated in FIG. 10 are acquired through division performed according to the main process content in order to easily understand the process of the swing analysis device 2. The invention is not limited according to a method of dividing the process units or the names of the process units. It is possible to divide the process of the swing analysis device 2 into a larger number of process units according to the process content. In addition, it is possible to perform division such that one process unit includes a larger number of processes. Further, the sequence of the processes in the flowchart is not limited to the example illustrated in the drawing.

The invention is not limited to the exemplified golf, and can be applied to, for example, sports, such as baseball, tennis, badminton, or table tennis, in which a sporting apparatus is swung.

The entire disclosure of Japanese Patent Application No. 2015-146409, filed Jul. 24, 2015 is expressly incorporated by reference herein.

What is claimed is:

1. A swing analysis device comprising:
an angle calculator that calculates an upper limit angle and a lower limit angle during a predetermined period of swing of a sporting apparatus based on a plurality of angles, formed by the sporting apparatus and predetermined plane, in a plurality of locations during the predetermined period; and
an index setting unit that sets an upper limit plane based on the upper limit angle and a stroke direction, and sets a lower limit plane based on the lower limit angle and the stroke direction,
wherein the upper limit angle and the lower limit angle are the maximum angle and the minimum angle, respectively, of a swing zone determined based on the plurality of angles and a standard deviation of the plurality of angles.

2. The swing analysis device according to claim 1,
wherein the angle calculator calculates a degree of variation in the respective angles, formed by the sporting apparatus and the predetermined plane, in the plurality of locations which are included in a swing locus during the predetermined period, and calculates the upper limit angle and the lower limit angle based on the degree of variation.

3. The swing analysis device according to claim 2,
wherein the predetermined plane is a horizontal plane which includes the stroke direction, and
wherein the angle calculator calculates the plurality of angles based on a crossing angle formed by a line, which connects the location and an axis corresponding to the stroke direction and which crosses the axis by a predetermined angle, and the predetermined plane.

4. The swing analysis device according to claim 1, further comprising:
an evaluation unit that compares a location of the swing locus during the predetermined period with a location of at least one of the upper limit plane and the lower limit plane.

5. The swing analysis device according to claim 1, further comprising:
an evaluation unit that compares an upper limit angle of a first swing with an upper limit angle of a second swing, or compares a lower limit angle of the first swing with a lower limit angle of the second swing.

6. The swing analysis device according to claim 1, further comprising:
an output unit that outputs an image which expresses at least one of the upper limit plane and the lower limit plane.

7. The swing analysis device according to claim 1,
wherein the angle calculator calculates an upper limit angle and a lower limit angle of reference swing, which is reference, based on the upper limit angle and the lower limit angle of a plurality of swings, and
wherein the index setting unit sets an upper limit plane and a lower limit plane of the reference swing based on the upper limit angle and the lower limit angle of the reference swing.

8. The swing analysis device according to claim 7, further comprising:
an evaluation unit that compares a location of a swing locus during the predetermined period of a first swing with a location of at least one of the upper limit plane and the lower limit plane of the reference swing.

9. The swing analysis device according to claim 7, further comprising:
the evaluation unit that compares an upper limit angle of a first swing with the upper limit angle of the reference swing or compares a lower limit angle of the first swing with the lower limit angle of the reference swing.

10. The swing analysis device according to claim 7, further comprising:
an output unit that outputs an image which expresses at least one of the upper limit plane and the lower limit plane of the reference swing.

11. The swing analysis device according to claim 4, further comprising:
an output unit that outputs an image or sound which expresses a result of comparison performed by the evaluation unit.

12. A swing analysis method comprising:
calculating an upper limit angle and a lower limit angle during a predetermined period of swing of a sporting apparatus based on a plurality of angles, formed by the sporting apparatus and predetermined plane, in a plurality of locations during the predetermined period;

setting an upper limit plane based on the upper limit angle and a stroke direction; and setting a lower limit plane based on the lower limit angle and the stroke direction, wherein the upper limit angle and the lower limit angle are the maximum angle and the minimum angle, respectively, of a swing zone determined based on the plurality of angles and a standard deviation of the plurality of angles.

13. The swing analysis method according to claim 12, wherein the calculating includes calculating a degree of variation in the respective angles, formed by the sporting apparatus and the predetermined plane, in the plurality of locations which are included in a swing locus during the predetermined period, and calculating the upper limit angle and the lower limit angle based on the degree of variation.

14. The swing analysis method according to claim 13, wherein the calculating includes calculating the angles based on a crossing angle formed by a line, which connects the location and an axis corresponding to the stroke direction and which crosses the axis by a predetermined angle, and the predetermined plane.

15. The swing analysis method according to claim 12, further comprising:

comparing a location of the swing locus during the predetermined period with a location of at least one of the upper limit plane and the lower limit plane.

16. The swing analysis method according to claim 12, further comprising:

comparing an upper limit angle of a first swing with an upper limit angle of a second swing or comparing a lower limit angle of the first swing with a lower limit angle of the second swing.

17. The swing analysis method according to claim 12, further comprising:

outputting an image which expresses at least one of the upper limit plane and the lower limit plane.

18. A storage medium which stores a program that causes a computer to:

calculate an upper limit angle and a lower limit angle during a predetermined period of swing of a sporting apparatus based on a plurality of angles, formed by the sporting apparatus and predetermined plane, in a plurality of locations during the predetermined period;

set an upper limit plane based on the upper limit angle and a stroke direction; and set a lower limit plane based on the lower limit angle and the stroke direction, wherein the upper limit angle and the lower limit angle are the maximum angle and the minimum angle, respectively, of a swing zone determined based on the plurality of angles and a standard deviation of the plurality of angles.

19. A swing analysis system comprising:

the swing analysis device according to claim 1; and a sensor unit that is mounted on a sporting apparatus.

20. A swing analysis method comprising:

acquiring measurement data relevant to swing of a sporting apparatus which is measured by a sensor unit that is mounted on the sporting apparatus;

calculating a locus of the swing of the sporting apparatus during a predetermined period based on the measurement data;

calculating an upper limit angle and a lower limit angle based on a plurality of angles, formed by the sporting apparatus and predetermined plane, in a plurality of locations based on the locus;

setting an upper limit plane based on the upper limit angle and a stroke direction; and setting a lower limit plane based on the lower limit angle and the stroke direction, wherein the upper limit angle and the lower limit angle are the maximum angle and the minimum angle, respectively, of a swing zone determined based on the plurality of angles and a standard deviation of the plurality of angles.

21. A swing analysis device which calculates an upper limit angle and a lower limit angle during a predetermined period of swing of a sporting apparatus based on a plurality of angles, formed by the sporting apparatus and predetermined plane, in a plurality of locations during the predetermined period; sets an upper limit plane based on the upper limit angle and a stroke direction; and sets a lower limit plane based on the lower limit angle and the stroke direction, wherein the upper limit angle and the lower limit angle are the maximum angle and the minimum angle, respectively, of a swing zone determined based on the plurality of angles and a standard deviation of the plurality of angles.

22. The swing analysis device according to claim 21, wherein the swing analysis device calculates the upper limit angle and the lower limit angle based on a degree of variation in the respective angles, formed by the sporting apparatus and the predetermined planes, in the plurality of locations which are included in a swing locus during the predetermined period.

23. The swing analysis device according to claim 22, wherein the swing analysis device calculates the plurality of angles based on a crossing angle formed by a line, which connects the location and an axis corresponding to the stroke direction and which crosses the axis by a predetermined angle, and the predetermined plane.

* * * * *